(12) United States Patent
Gomi

(10) Patent No.: US 7,956,915 B2
(45) Date of Patent: Jun. 7, 2011

(54) SOLID-STATE IMAGING APPARATUS

(75) Inventor: Yuichi Gomi, Hachioji (JP)

(73) Assignee: Olympus Corporation, Tokyo (JP)

( * ) Notice: Subject to any disclaimer, the term of this patent is extended or adjusted under 35 U.S.C. 154(b) by 856 days.

(21) Appl. No.: 11/836,382

(22) Filed: Aug. 9, 2007

(65) Prior Publication Data

US 2008/0036892 A1     Feb. 14, 2008

(30) Foreign Application Priority Data

Aug. 9, 2006   (JP) .................. 2006-216690

(51) Int. Cl.
 *H04N 3/14* (2006.01)
 *H04N 5/335* (2011.01)
(52) U.S. Cl. ......... 348/308; 348/294; 348/296; 348/302
(58) Field of Classification Search .......... 348/294–310; 250/208.1
 See application file for complete search history.

(56) References Cited

U.S. PATENT DOCUMENTS

| 7,071,453 | B1 * | 7/2006 | Pine ........................ 250/208.1 |
| 7,391,453 | B2 * | 6/2008 | Ohkawa ...................... 348/302 |
| 7,511,752 | B2 * | 3/2009 | Kurane ....................... 348/296 |
| 7,719,583 | B1 * | 5/2010 | Lee et al. ..................... 348/294 |

| 2004/0080659 | A1 | 4/2004 | Iwane et al. |
| 2005/0225653 | A1 * | 10/2005 | Masuyama et al. .......... 348/241 |
| 2008/0018761 | A1 | 1/2008 | Kondo et al. |

FOREIGN PATENT DOCUMENTS

JP     2006-108889 A     4/2006

OTHER PUBLICATIONS

U.S. Office Action issued Jul. 12, 2010 in related U.S. Appl. No. 11/779,614.

* cited by examiner

*Primary Examiner* — Jason Chan
*Assistant Examiner* — Pritham Prabhakher
(74) *Attorney, Agent, or Firm* — Westerman, Hattori, Daniels & Adrian, LLP

(57) ABSTRACT

A solid-state imaging apparatus including: a solid-state imaging device having a pixel section formed of a plurality of pixels in a two-dimensional array each containing a photoelectric conversion section for generating a signal corresponding to a quantity of incident light, a read drive section for setting one or more pixels in the pixel section as a read unit group to effect read operation by the unit of the read unit group, and a global shutter function setting section for obtaining an imaging signal where an exposure start timing and an exposure period of all subject pixels in the pixel section are the same; a light quantity distribution detecting means for detecting a distribution of said quantity of incident light to the pixel section of the solid-state imaging device; and a drive control means for setting to the read drive section an order of read sequence of the read unit groups based on a light quantity distribution information of the pixel section detected at the light quantity distribution detecting means.

4 Claims, 14 Drawing Sheets

US 7,956,915 B2

SOLID-STATE IMAGING APPARATUS

This application claims benefit of Japanese Patent Application No. 2006-216690 filed in Japan on Aug. 9, 2006, the contents of which are incorporated by this reference.

BACKGROUND OF THE INVENTION

The present invention relates to solid-state imaging apparatus having a concurrent shutter (also referred to as global shutter) function, in which an occurrence of signal deterioration or spurious signal can be prevented even when an image of high-luminance object is taken.

MOS solid-state imaging devices are conventionally known as those using pixels having amplification/read function as solid-state imaging device. FIG. 1 shows a pixel construction of MOS solid-state imaging device. Shown respectively in FIG. 1 are: 100, a single pixel; 101, a photodiode serving as photoelectric conversion device; 102, a transfer transistor for transferring signal charge generated at photodiode 101 to a charge accumulation section (FD) 103; 104, a reset transistor for resetting the photodiode 101 and charge accumulation section 103; 105, an amplification transistor for amplifying and reading voltage level at the charge accumulation section 103; and 106, a select transistor for selecting the pixel so as to transmit an output of the amplification transistor 105 to a vertical signal line 114. These but photodiode 101 are shielded from light.

Further, denoted by 110 is a pixel power supply for applying a power supply voltage VDD, which is electrically connected to drain of the amplification transistor 105 and to drain of the reset transistor 104. Denoted by 111 is a reset line to which row reset pulse φ RMi for resetting pixels corresponding to one row is applied, which is connected to the gate of reset transistor 104 of the pixels corresponding to one row. Denoted by 112 is a transfer line to which row transfer pulse φ TRi for transferring the signal charge of the pixels corresponding to one row to the charge accumulation section 103 of the respective pixel is applied, which is electrically connected respectively to the gate of transfer transistor 102 of the pixels corresponding to one row. Denoted by 113 is a select line to which row select pulse φ SEi for selecting pixels corresponding to one row is applied, which is electrically connected respectively to the gate of select transistor 106 of the pixels corresponding to one row. With the pixel construction using four transistors in this manner, a photoelectric conversion function, reset function, amplification/read function, temporary memory function, and select function are achieved.

The pixels having such construction are arranged into m-rows by n-columns to form a pixel array, and a normal XY-addressing read method (also referred to as rolling shutter read method) using a vertical and horizontal scanning circuits (not shown) is employed to sequentially select and read pixel signals row by row from the first row to m-th row so as to read all pixel signals.

In such normal XY-addressing read method, however, the point in time for transferring/accumulating signal to/at the charge accumulation section 103 is different from one row to another of the pixel array. More specifically, there is a difference in time corresponding to one frame at maximum between the first row to be read out first and m-th row to be read out at the end. For this reason, a distorted image problem occurs when a rapidly moving object is photographed.

The global shutter read method is a method for solving the above problem in the normal XY-addressing read method as described. An operation of the global shutter read method will now be described with reference to the timing chart shown in FIG. 2. First, as row reset pulses φ RM1 to φ RMm and row transfer pulses φ TR1 to φ TRm of all rows are simultaneously outputted from the vertical scanning circuit (not shown), photodiodes 101 of the pixels corresponding to all rows are reset. Subsequently, after a certain signal accumulation period (exposure period), row transfer pulses fTR1 to fTRm of all rows are simultaneously outputted from the vertical scanning circuit. The signal charges accumulated within the exposure period at photodiode 101 of the pixels corresponding to all rows are thereby transferred simultaneously for all rows to the charge accumulation section 103. Such operation effects a global shutter operation.

A row-by-row read of signal charges accumulated at the electric charge accumulation section 103 is then started. First, as row select pulse φ SE1 is outputted, pixels of the first row are selected and signal levels of the pixels are read out. Further, as row reset pulse φ RM1 is outputted, the electric charge accumulation sections 103 of the pixels of the first row are reset, and the reset levels of the pixels are read out. When the readout of signal level and reset level of the pixels of the first row are complete, pixels of the second row are selected, and the signal level and reset level thereof are read out. By performing this signal read scanning until m-th row, signals of one frame are read out.

Further, a solid-state imaging device has been proposed in Japanese Patent Application Laid-Open 2006-108889 where a pixel array having 2m-rows by n-columns of single pixels of the pixel construction as shown in FIG. 1 is used to effect an image signal output as in the following. In particular, as shown in FIG. 3, a signal-to-be pixel group 200-1, 200-2, . . . where signals of photodiode are simultaneously reset for all pixels and, after completion of a predetermined exposure period, the signals generated at photodiode are transferred to the charge accumulation section, and a correcting pixel group 300-1, 300-2, . . . where the signals generated at photodiode are not transferred to the charge accumulation section are provided alternately on every other row in the pixel array so that difference between the respective signal outputs of the signal-to-be pixel group 200-1, 200-2, . . . , and of the correcting pixel group 300-1, 300-2, . . . is obtained and outputted as image signal.

FIG. 4 shows a timing chart for explaining operation of the solid-state imaging device having such construction. In FIG. 4, "1M-th to mM-th rows" refers to the first to m-th rows of the signal-to-be pixel group 200-L, 200-2, . . . and "1S-th to mS-th rows" refers to the first to m-th rows of the correcting pixel group 300-1, 300-2, . . . , etc.

According to thus constructed solid-state imaging apparatus, if signals are sequentially read out row by row after concurrently transferring the signal charges to the charge accumulation section, signal retaining time at the charge accumulation section of the pixels of the rows which are read out late becomes relatively longer. While this tends to cause shading as generated by leak current or Leakage of light at the charge accumulation section, an occurrence of such shading can presumably be prevented by the above described method where a difference signal is obtained.

SUMMARY OF THE INVENTION

In a first aspect of the invention, there is provided a solid-state imaging apparatus including: a solid-state imaging device having a pixel section formed of a plurality of pixels in a two-dimensional array each containing a photoelectric conversion section for generating a signal corresponding to a quantity of incident light, a read drive section for setting one or more pixels in the pixel section as a read unit group to effect read operation by the unit of the read unit group, and a global shutter function setting section for obtaining an imaging signal where an exposure start timing and an exposure period of all subject pixels in the pixel section are the same; a light quantity distribution detecting means for detecting a distribution of the quantity of incident light to the pixel section of the solid-state imaging device; and a drive control means for setting to the read drive section an order of read sequence of the read unit groups based on a light quantity distribution information of the pixel section detected at the light quantity distribution detecting means.

In a second aspect of the invention, the drive control means in the solid-state imaging apparatus according to the first aspect sets the order of read sequence of pixel signal of the read unit groups so that a read unit group containing a pixel with a greater light quantity or a pixel region with a greater light quantity is treated first.

In a third aspect of the invention, the light quantity distribution detecting means in the solid-state imaging apparatus according to the first or second aspect effects a preliminary image taking operation with using the solid-state imaging device to detect the light quantity distribution from image signals outputted from the pixel section in the preliminary image taking.

In a fourth aspect of the invention, the solid-state imaging apparatus according to the first or second aspect further includes a photometry means, wherein the light quantity distribution detecting means detects the light quantity distribution from a photometric signal of the photometry means.

In a fifth aspect of the invention, the pixel section of the solid-state imaging device in the solid-state imaging apparatus according to any one aspect of the first to fourth aspects includes a pixel having the photoelectric conversion section for generating the signal corresponding to the quantity of incident light, an accumulation section for accumulating signal generated at the photoelectric conversion section, a transfer means for controlling a signal transfer from the photoelectric conversion section to the accumulation section, and a reset means for resetting the signal of the photoelectric conversion section. The global shutter function setting section sets the read drive section so as to read and output a signal level at the accumulation section as pixel signal with determining the exposure period by simultaneously resetting signals of the photoelectric conversion section of all pixels and, after a predetermined time, by simultaneously effecting the signal transfer from the photoelectric conversion section to the accumulation section.

In a sixth aspect of the invention, the pixel section of the solid-state imaging device in the solid-state imaging apparatus according to any one aspect of the first to fourth aspects includes a pixel having the photoelectric conversion section for generating the signal corresponding to the quantity of incident light, an accumulation section for accumulating the signal generated at the photoelectric conversion section, a transfer means for controlling a signal transfer from the photoelectric conversion section to the accumulation section, and a reset means for resetting the signal of the photoelectric conversion section, and contains a signal-to-be pixel group where signals generated at the photoelectric conversion section are transferred to the accumulation section after completion of the exposure period, and a correcting pixel group where signals generated at the photoelectric conversion section are not transferred to the accumulation section. The global shutter function setting section sets the read drive section so as to determine an exposure period by simultaneously resetting signals of the photoelectric conversion section of all pixels and, after a predetermined time, by simultaneously effecting signal transfer from the photoelectric conversion section to the accumulation section of the signal-to-be pixel group, and to read signal levels of the accumulation section in the signal-to-be pixel group and the correcting pixel group as a pixel signal, and output a difference signal between the pixel signals of the signal-to-be pixel group and of the correcting pixel group as the imaging signal.

In a seventh aspect of the invention, the pixel section of the solid-state imaging device in the solid-state imaging apparatus according to any one aspect of the first to fourth aspects includes a pixel having a first and a second photoelectric conversion sections for generating signal corresponding to the quantity of incident light, an accumulation section for accumulating signals generated at the first and the second photoelectric conversion sections, a first and second transfer means for controlling signal transfer from the first and the second photoelectric conversion sections to the accumulation section, and a reset means for resetting signals of the first and the second photoelectric conversion sections. The global shutter function setting section sets the read drive section so as to simultaneously reset signals of the first photoelectric conversion section of all pixels, and after a predetermined time effect resetting of signals of the second photoelectric conversion section simultaneously for all pixels to determine a time difference from the resetting of the first photoelectric conversion section to the resetting of the second photoelectric conversion section as the exposure period, and so as to output a difference of signals between the first and the second photoelectric conversion sections of each pixel as a pixel signal.

DESCRIPTION OF THE PREFERRED EMBODIMENTS

Some embodiments of the solid-state imaging apparatus according to the invention will be described below with reference to the drawings.

Figure 5:
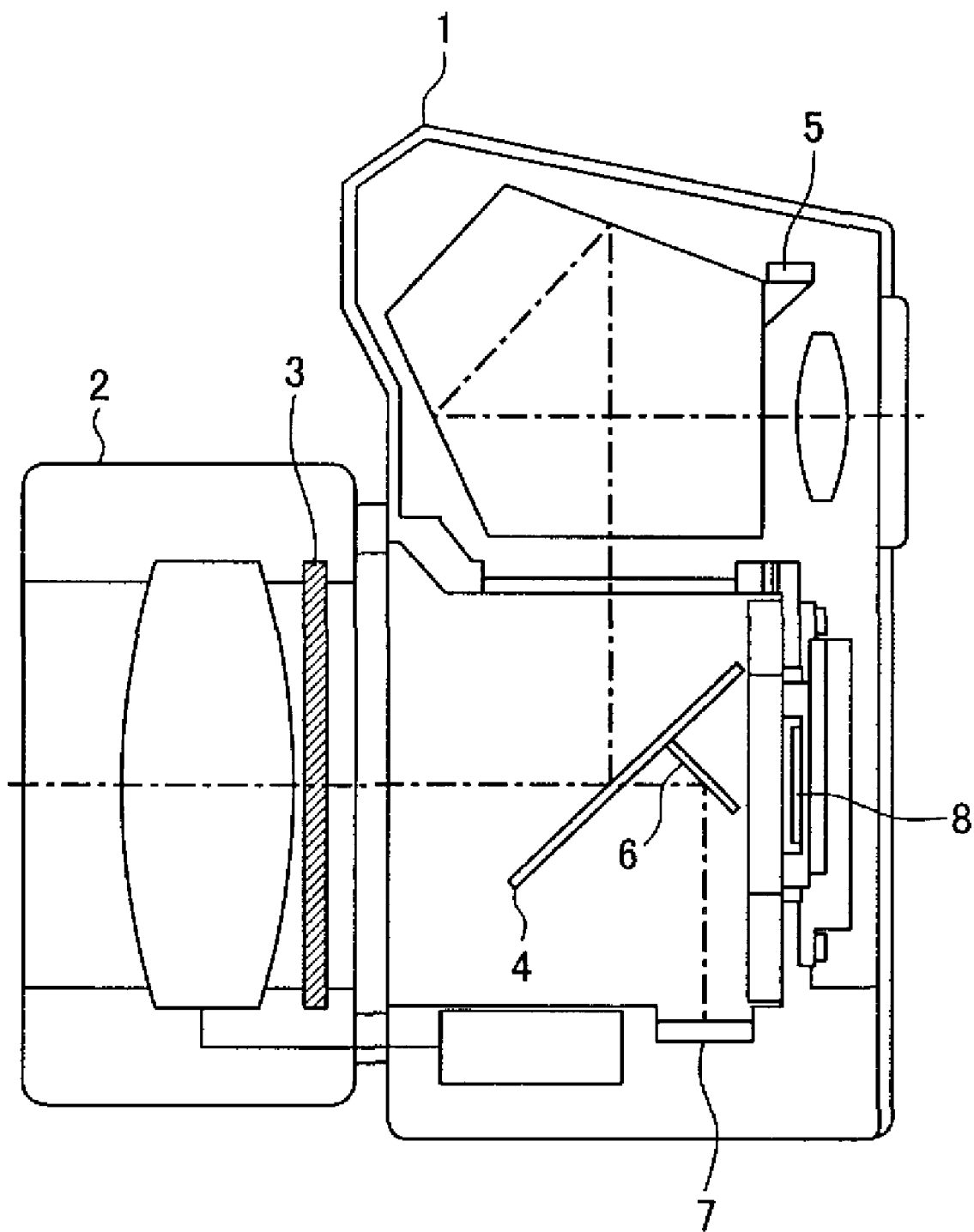
FIG. 5 schematically shows construction of an electronic camera to which the solid-state imaging apparatus according to the invention is applied.

The fundamental construction of a general single lens reflex type electronic camera will now be described by way of FIG. 5 as an example of construction of camera system to which the solid-state imaging apparatus according to the invention is applied. FIG. 5 includes: a camera body 1; a taking optical system 2; a stop mechanism 3; a quick return mirror 4; a photometry section 5; a focus detecting mirror 6; a focus detecting section 7; and a solid-state imaging device 8.

Figure 6:
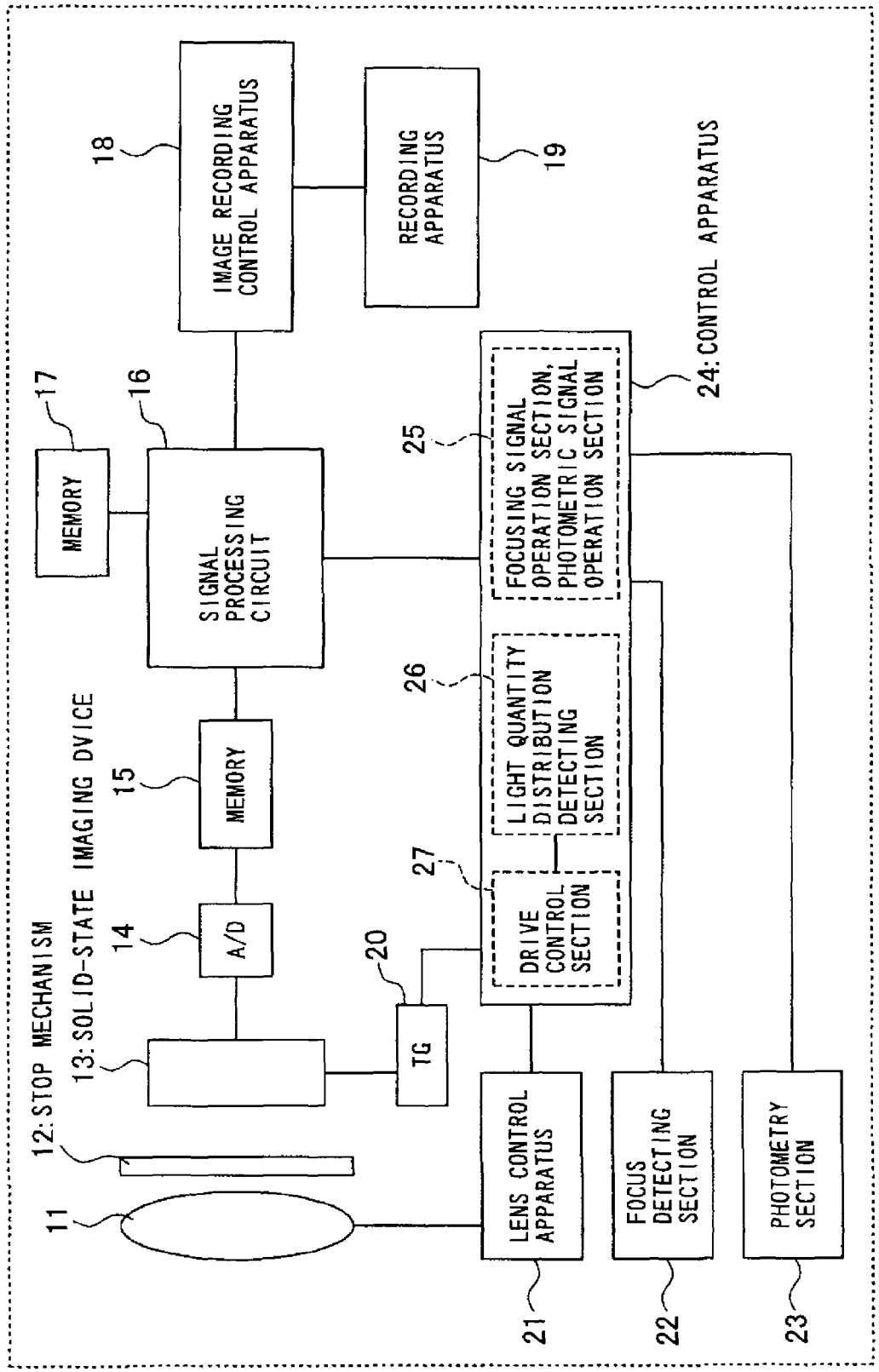
FIG. 6 is a block diagram showing construction of a first embodiment of the solid-state imaging apparatus according to the invention.

FIG. 6 is a block diagram showing construction of a first embodiment of the solid-state imaging apparatus according to the invention which is applied for example to the electronic camera shown in FIG. 5. FIG. 6 includes: a lens 11; a stop mechanism 12; a solid-state imaging device 13; A/D converter 14; a memory 15; a signal processing circuit 16; a memory 17; an image recording control apparatus 18; a recording apparatus 19; TG circuit 20 where drive signals for driving the solid-state imaging device 13 are generated; a lens control apparatus 21; a focus detecting section 22; a photometry section 23; and a control apparatus 24 for controlling each section, the control apparatus 24 including a focus signal operation section and photometric signal operation section 25, a light quantity distribution detecting section 26, a drive control section 21, etc.

Figure 7:
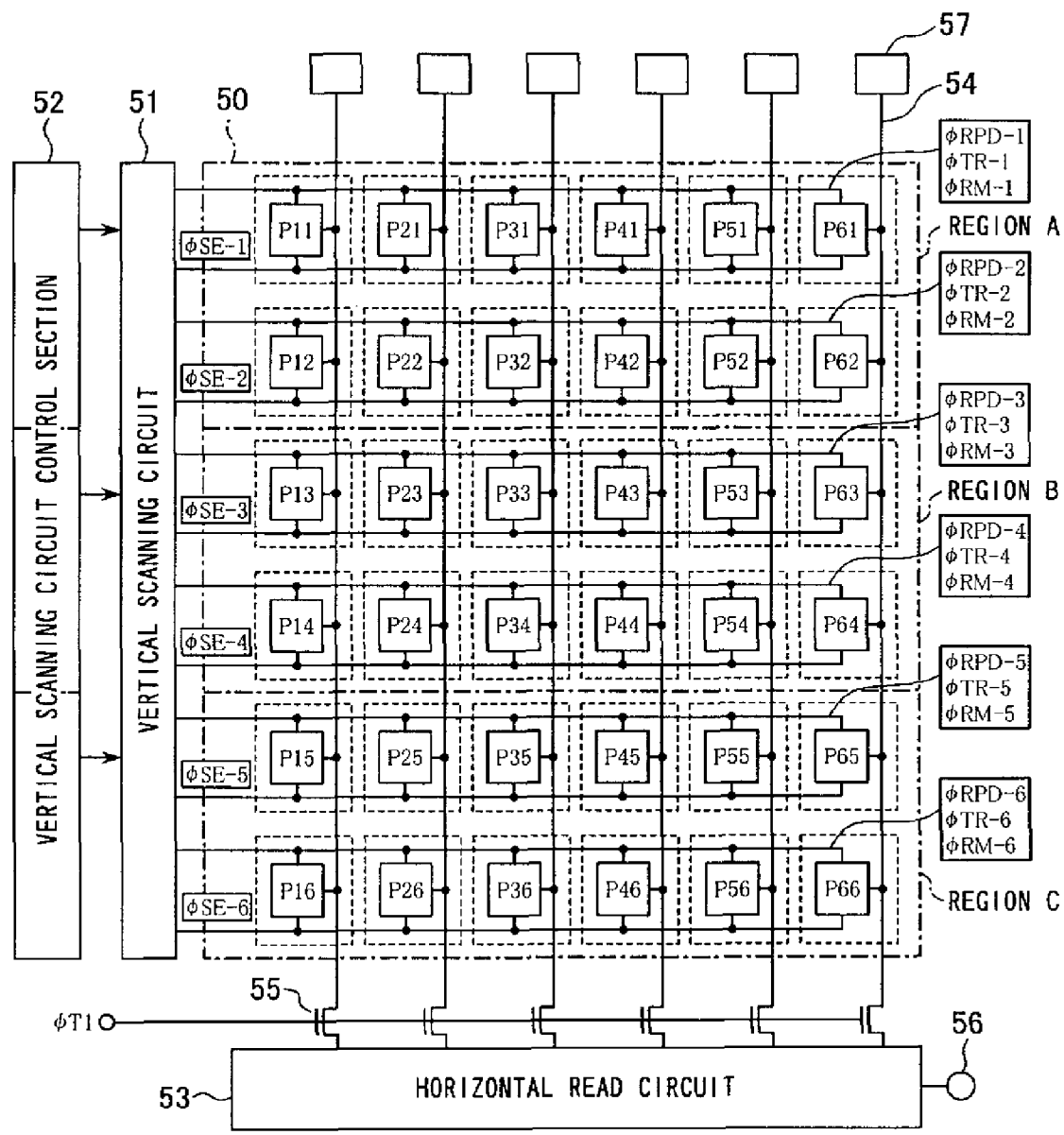
FIG. 7 is a block diagram showing construction of the solid-state imaging device in the first embodiment shown in FIG. 6.
Figure 8:
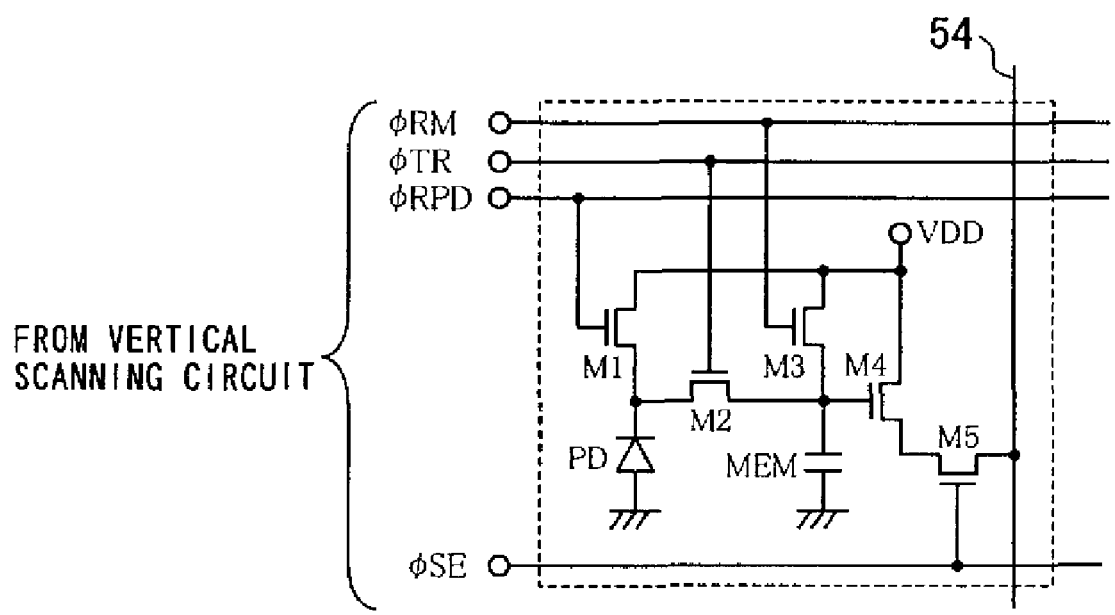
FIG. 8 is a circuit diagram showing a pixel construction of the solid-state imaging device shown in FIG. 7.

FIG. 7 is a block diagram showing an overall construction of solid-state imaging device of the solid-state imaging apparatus according to the first embodiment; and FIG. 8 shows a circuit construction corresponding to one pixel used in the solid-state imaging device shown in FIG. 7. Referring to FIG. 7, denoted by 50 is a pixel section showing construction of the case where 6 by 6 pixels indicated by P11 to P66 are two-dimensionally arrayed. Denoted by 51 is a vertical scanning circuit for selecting pixels by the unit of row. The signals of the pixels of selected row are then outputted to a vertical signal line 54 which is provided for each column. Denoted by 52 is a vertical scanning circuit control section which effects control based on drive control signal from TG circuit 20 over selection of the order of sequence according to which the vertical scanning circuit 51 selects one of three divisional regions (read unit group) of region A, region B, region C as indicated within the pixel section 50. In the illustrated example, a case of dividing the pixel section 50 into three regions each of two rows as region A, region B, region C is indicated. It should be noted that the number of divisional regions of the pixel section 50 is not limited to 3 and may be set to an optional number.

Denoted by 53 is a horizontal read circuit by which signals of the pixels corresponding to one row selected by the vertical scanning circuit 51 and outputted to the vertical signal line 54 are fetched through a fetch switch 55 controlled by fetch pulse φ T1, so as to output the signals of the pixels of such row from an output terminal 56 in time series according to their order of arrangement in the horizontal direction. Denoted by 57 is a current source connected to the vertical signal line 54.

Figure 1:
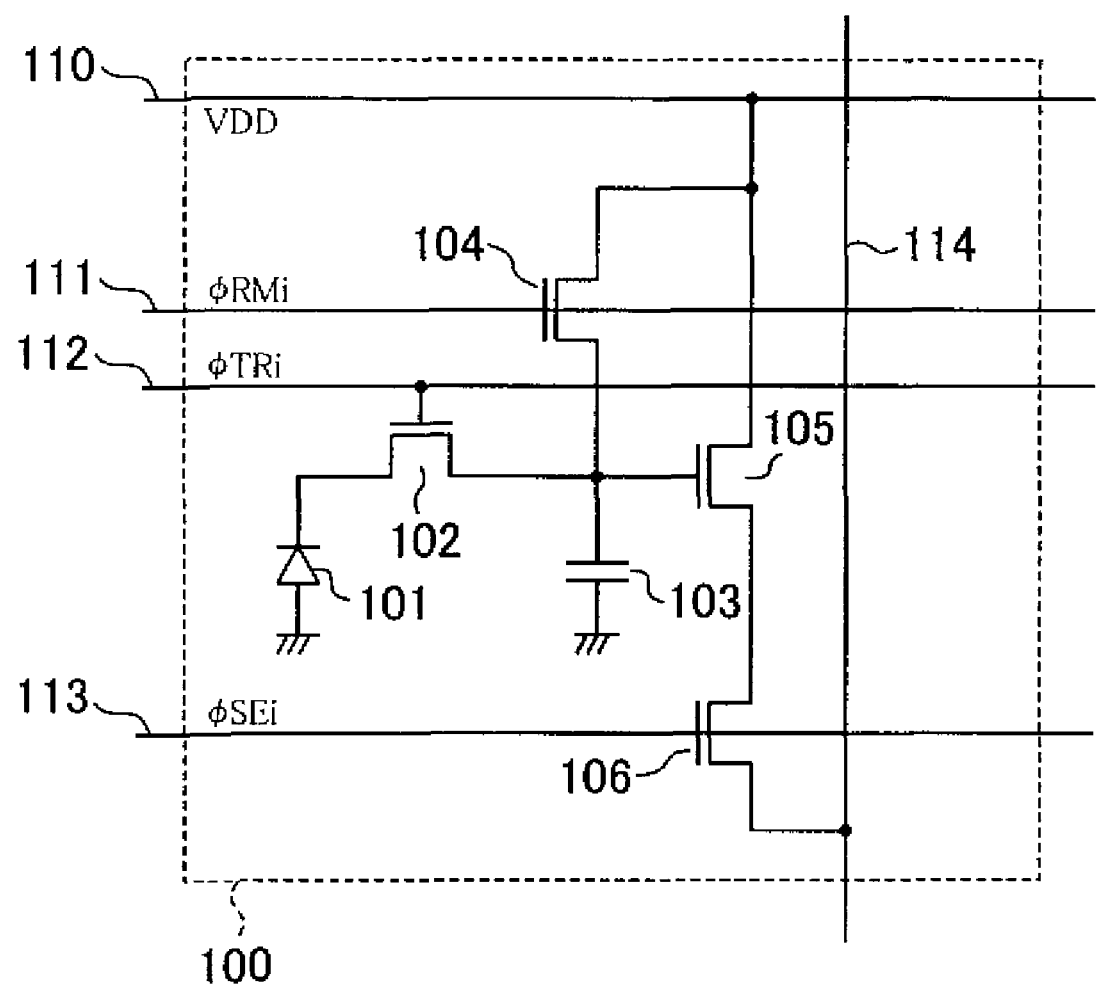
FIG. 1 shows a pixel construction of prior-art MOS imaging device.
Figure 2:
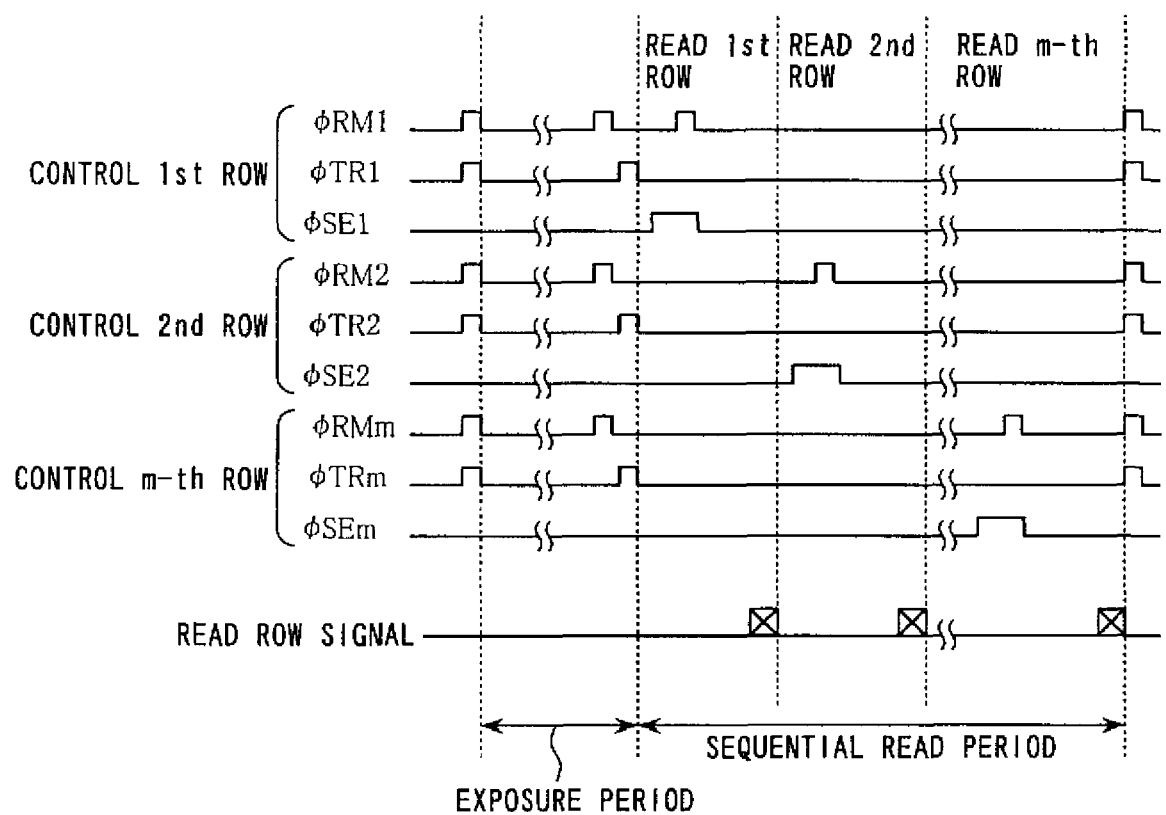
FIG. 2 is a timing chart for explaining operation of a global shutter read method of prior-art MOS imaging device.

The construction of a pixel in the solid-state imaging apparatus having such construction will now be described. Although 4-Tr construction shown in FIG. 1 may be used as a pixel, one having construction shown in FIG. 8 is used herein. In FIG. 8, PD refers to a photoelectric conversion device, and MEM a charge accumulation section for retaining signal of the photoelectric conversion device PD. Here, the charge accumulation section MEM is shielded from light so that the signal retained at the charge accumulation section MEM is not changed even when light is allowed to enter the pixel section 50. M1 refers to a transistor for resetting the photoelectric conversion device PD, which is controlled by PD reset pulse φ RPD. M2 refers to a transistor for transferring the signal of the photoelectric conversion device PD to the charge accumulation section MEM, which is controlled by transfer pulse φ TR. M4 refers to an amplification transistor which forms a source follower amplifier with the current source 57 provided on the vertical signal line 54. The signal of charge accumulation section MEM is amplified by the amplification transistor M4 and is outputted to the vertical signal line 54 through a select transistor M5. The select transistor M5 is controlled by select pulse φ SE. M3 refers to a transistor for resetting the charge accumulation section MEM and an input section of amplification transistor M4, which is controlled by reset pulse φ RM.

Figure 9:
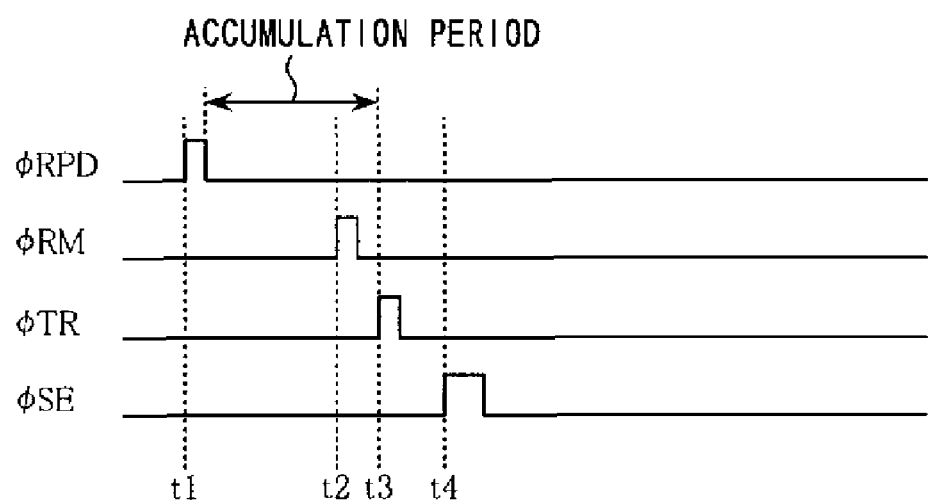
FIG. 9 is a timing chart for explaining operation of the pixel shown in FIG. 8.

Before describing operation of the solid-state imaging apparatus and solid-state imaging device shown in FIGS. 6 and 7, an operation of the pixel shown in FIG. 8 will be described below by way of the timing chart shown in FIG. 9. Referring to FIG. 9, when PD reset pulse φ RPD is driven to "H" level at time t1, the photoelectric conversion device PD is reset. Subsequently, when PD reset pulse φ RPD is driven to "L" level, the photoelectric conversion device PD starts to accumulate signal generated by incident light. At time t2, reset pulse φ RM is driven to "H" level to reset the charge accumulation section MEM. Subsequently, transfer pulse φ TR is driven to "H" level at time t3 so that signal accumulated at photoelectric conversion device PD up to that point in time is transferred/retained to/at the charge accumulation section MEM.

At time t4, then, select pulse φ SE is driven to "H" level so as to amplify signal retained at the charge accumulation section MEM and output it onto the vertical signal line 54. After that, signal is outputted from an output terminal through the fetch switch and horizontal read circuit. With the pixel shown in FIG. 8, therefore, if operation from time t1 to time t3 is effected for example concurrently for all pixels, the accumulation period becomes the same one for all pixels.

An operation of the solid-state imaging apparatus according to the first embodiment shown in FIG. 6 will now be described. In the present embodiment, there are two cases of image taking sequence, i.e., the case where a light quantity distribution of the pixel section is detected based on image signal obtained by a preliminary image taking to set the order of reading each read region (read unit group) at the time of a main image taking, and the case where a light quantity distribution of each read region of the pixel section is detected based on photometric signal of regions in the photometry section corresponding to each read region of the pixel section to set the order of reading each read region of the pixel section at image taking.

A description will first be given to the operation where a light quantity distribution of the pixel section is detected based on image signal obtained by a preliminary image taking so as to set the order of reading each read region (read unit group) at a main image taking. At first, the solid-state imaging device 13 according to the present embodiment is used to execute a preliminary image taking before the main image taking. The imaging signals from the solid-state imaging device 13 at the time of this preliminary image taking are received at the light quantity distribution detecting section 26 through the signal processing circuit 16 to detect a light quantity distribution of the pixel section. At the light quantity distribution detecting section 26 at this time, an average value or peak value of the respective light quantities is obtained for each of regions A, B, C of the pixel region 50.

The average value or peak value of light quantity of each region A, B, C detected at the light quantity distribution detecting section 26 is inputted to the drive control section 27. At the drive control section 27, a judgment is made as to whether or not these average values or peak values exceed a threshold which is determined with considering an allowable level of signal deterioration or presence of spurious signal occurrence. If there is a region where the average value or peak value of light quantity exceeds the threshold, a control signal is transmitted from the drive control section 27 to TG circuit 20 so as to read pixel signals at the main image taking first from the region exceeding the threshold. If there is no region where the average value or peak value of light quantity exceeds the threshold, on the other hand, a control signal is transmitted to TG circuit 20 so that, at the time of the main image taking, pixel signals of each region are sequentially read out in a normal way starting from one end side of the pixel section.

At the time of the main image taking, then, a drive signal is transmitted to the solid-state imaging device 13 from TG circuit 20 so that the regions of the pixel section are read out according to the order of read sequence as instructed by the drive control section 27. The readout of the regions is thereby effected in read sequence under the instruction based on the light quantity distribution.

A description will be given below with respect to operation in the case where image taking is effected with detecting a light quantity distribution of the pixel section based on photometric signal of the photometry section 23 so as to set read sequence of each read region of the pixel section. In this case, the photometry section 23 is previously divided into three regions A', B', C' corresponding to each divisional region A, B, C of the pixel section. Before taking image, a photometry of object is first effected at the photometry section 23 so that photometric signals from the regions A', B', C' of the photometry section 23 are received at the light quantity distribution detecting section 26 through the photometric signal operation section. At the light quantity distribution detecting section 26, then, a light quantity distribution of the pixel section is detected based on the photometric signal of the photometry section 23 so as to obtain an average value or peak value of the light quantity of each region.

A judgment is then made at the drive control section 27 as to whether or not the average values or peak values of light quantity of each region A, B, C of the pixel section detected based on photometric signal at the light quantity distribution detecting section 26 exceed a threshold which is determined with considering an allowable level of signal deterioration or presence of spurious signal occurrence. If there is a region where the average value or peak value of light quantity exceeds the threshold, a control signal is transmitted from the drive control section 27 to TG circuit 20 so that, at the time of image taking, pixel signals are read out first from the region exceeding the threshold in the pixels section. If there is no region where the average value or peak value of light quantity exceeds the threshold, on the other hand, a control signal is transmitted to TG circuit 20 so that, at the time of image taking, pixel signals of each region are sequentially read out in a normal way starting from one end side of the pixel section.

At the time of taking image, then, a drive signal is transmitted to the solid-state imaging device 13 from TG circuit 20 so that the regions of the pixel section are read out according to the order of read sequence as instructed by the drive control section 27. The readout of the regions is thereby effected in read sequence under the instruction based on the light quantity distribution.

Figure 10:
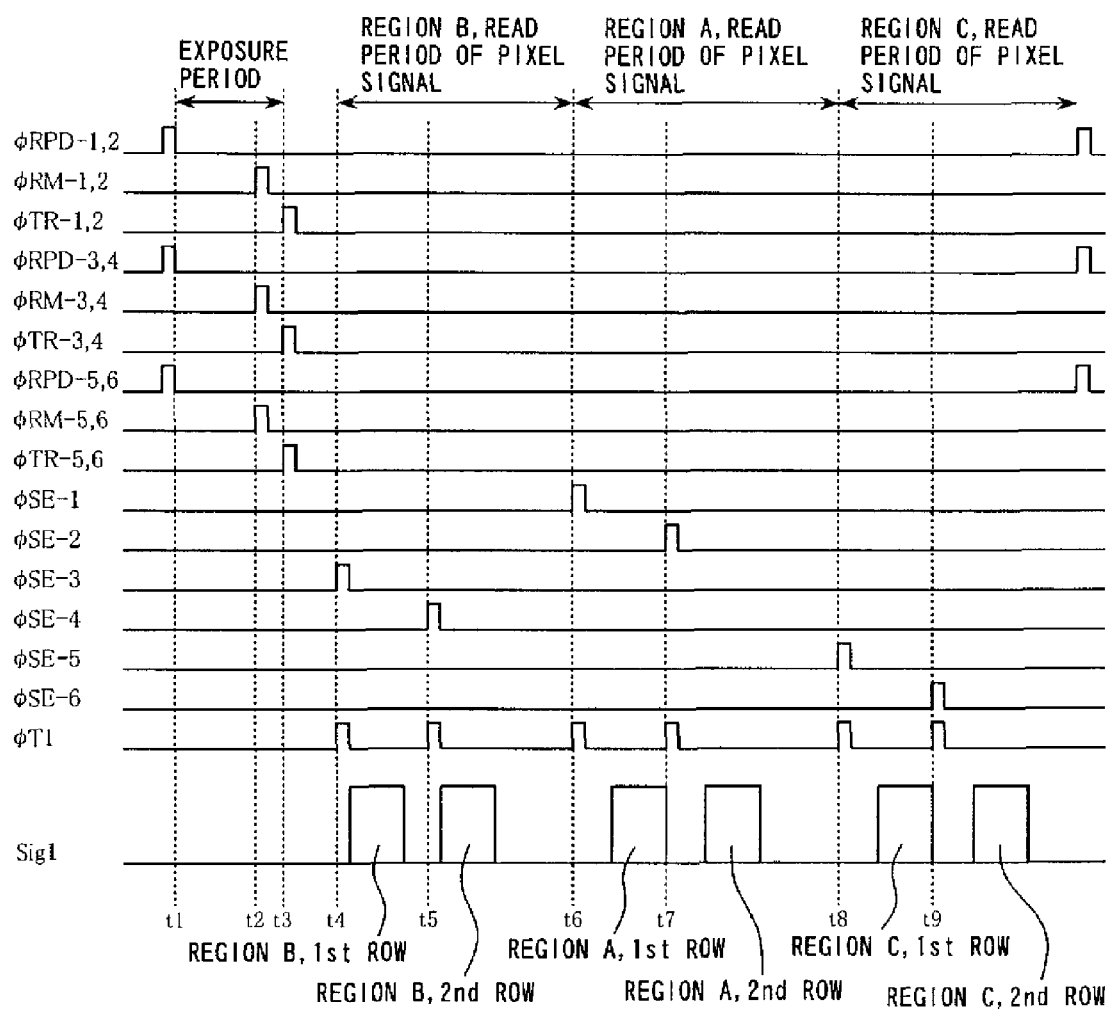
FIG. 10 is a timing chart for explaining operation of the solid-state imaging device shown in FIG. 7.

A description will now be given by way of the timing chart of FIG. 10 with respect to operation where the average value or peak value of light quantity of region B of the three divisional read regions (read unit group) A, B, C in the pixel section exceeds the threshold, and thus pixel signals are read out in the order of region B→region A→region C of the pixel section.

First at time t1, PD reset pulses φ RPD-1 to φ RPD-6 are driven to "L" level from "H" level to concurrently reset photoelectric conversion device PD and start accumulation of all pixels. Next at time t2, reset pulses φ RM-1 to φ RM-6 are driven to "H" level to concurrently reset the charge accumulation section MEM. Subsequently at time t3, transfer pulses φ TR-1 to φ TR-6 are driven to "H" level so that signals of photoelectric conversion device PD of all pixels are concurrently transferred to and retained at the charge accumulation section MEM. Here, period from time t1 to t3 becomes an exposure period which is the same for all pixels.

Next at time t4, select pulse φ SE-3 is driven to "H" level to select the third pixel row, or first row of region B of the pixel section, and in addition fetch pulse φ T1 is driven to "H" level to read pixel signals of such row from the output terminal 56 through the horizontal read circuit 53. Subsequently at time t5, select pulse φ SE-4 is driven to "H" level to select the fourth pixel row, or second row of region B of the pixel section, and in addition fetch pulse φ T1 is driven to "H" level to read pixel signals of the pixel row as output signal Sig1 from the output terminal 56 through the horizontal read circuit 53.

Subsequently at time t6, t7, select pulses φ SE-1, φ SE-2 are sequentially driven to "H" level to sequentially select the first and second pixel rows, or first and second rows of region A of the pixel section, and in addition fetch pulse φ T1 is driven to "H" level to sequentially read pixel signals of these pixel rows from the output terminal 56 through the horizontal read circuit 53. Similarly at time t8, t9, select pulses φ SE-5S, φ SE-6 are sequentially driven to "H" level to sequentially select the fifth and sixth pixel rows, or first and second rows of region C of the pixel section, and in addition fetch pulse φ T1 is driven to "H" level to sequentially read pixel signals of these pixel rows from the output terminal 56 through the horizontal read circuit 53.

As the above, a light quantity of object is previously monitored by a preliminary image taking or with a photometry section. At the time of the main image taking, then, the order of reading regions is controlled so that a region serving as read unit group containing a pixel or pixel region where signal deterioration or spurious signal tends to occur is read out first. It is thereby possible to effect a main image taking with suppressing an occurrence of signal deterioration or spurious signal to an extent possible.

It should be noted that the above embodiment has been shown as one where a threshold value is set for example by an allowable level of signal deterioration, and the order of reading each region is controlled by judgment as to whether or not the average value or peak value of light quantity exceeds the threshold. It is however also possible to control drive so as to read regions in the order of light quantity without setting a threshold. In other words, the region with a greater quantity of light is regarded as a region where signal deterioration and spurious signal tend to occur. Accordingly, with the setting where the region with a greater quantity of light is always read out first, the main image taking can be effected with suppressing an occurrence of signal deterioration or spurious signal to an extent possible. Also in this case, since such procedure as judgment on threshold is not necessary, construction of the drive control section becomes simple.

The noise of a pixel is generally increased when the solid-state imaging device uses pixels having an amplification device. It is therefore also possible to provide a means for suppressing such noise and to effect control accordingly.

In the case of effecting a preliminary image taking, it is not necessary to read signals of all pixels, and thinned-out read is also possible. In such case, time of the preliminary image taking can be shortened.

In the main image taking, the order of reading pixel signals is previously known, though the pixel signals are not necessarily read out in sequence starting from one end side of the pixel section. Therefore, by changing the arrangement of signals on the basis of such read sequence information, it is possible to effect an image processing in an entirely the same manner as the case of normal read.

Figure 3:
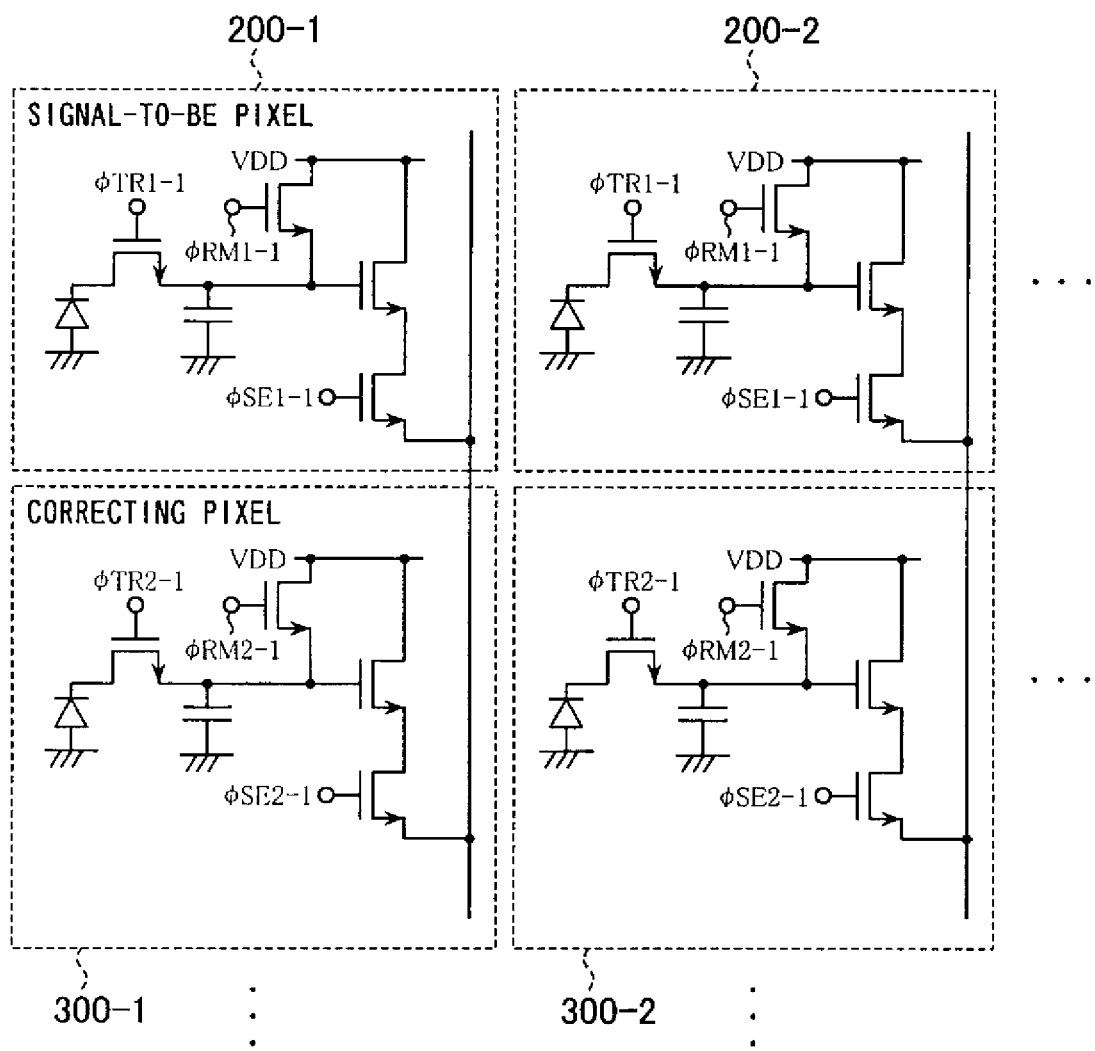
FIG. 3 shows construction of the pixel section of another prior-art MOS imaging device.
Figure 4:
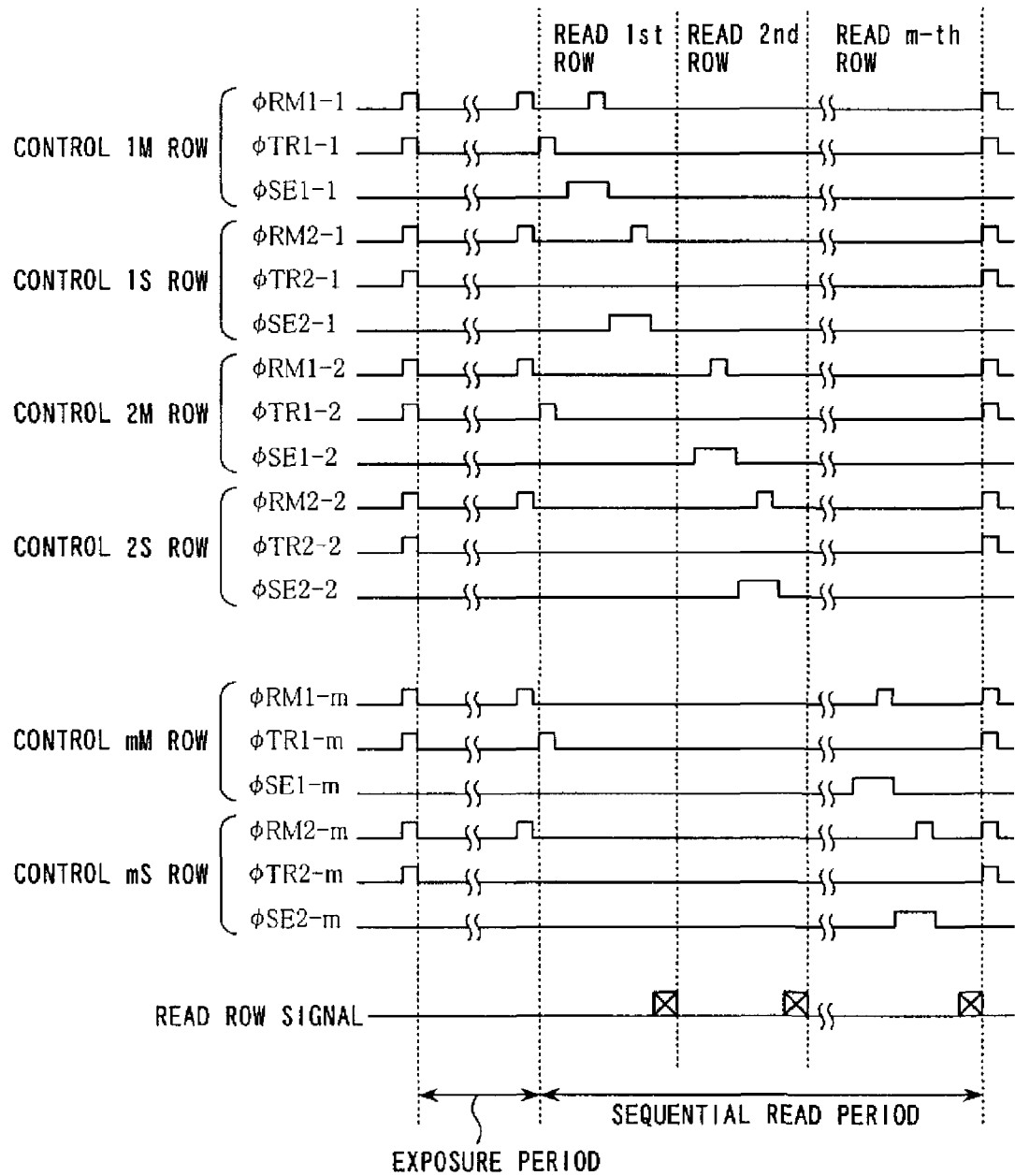
FIG. 4 is a timing chart for explaining signal read operation of pixel section of the prior-art example shown in FIG. 3.
Figure 11:
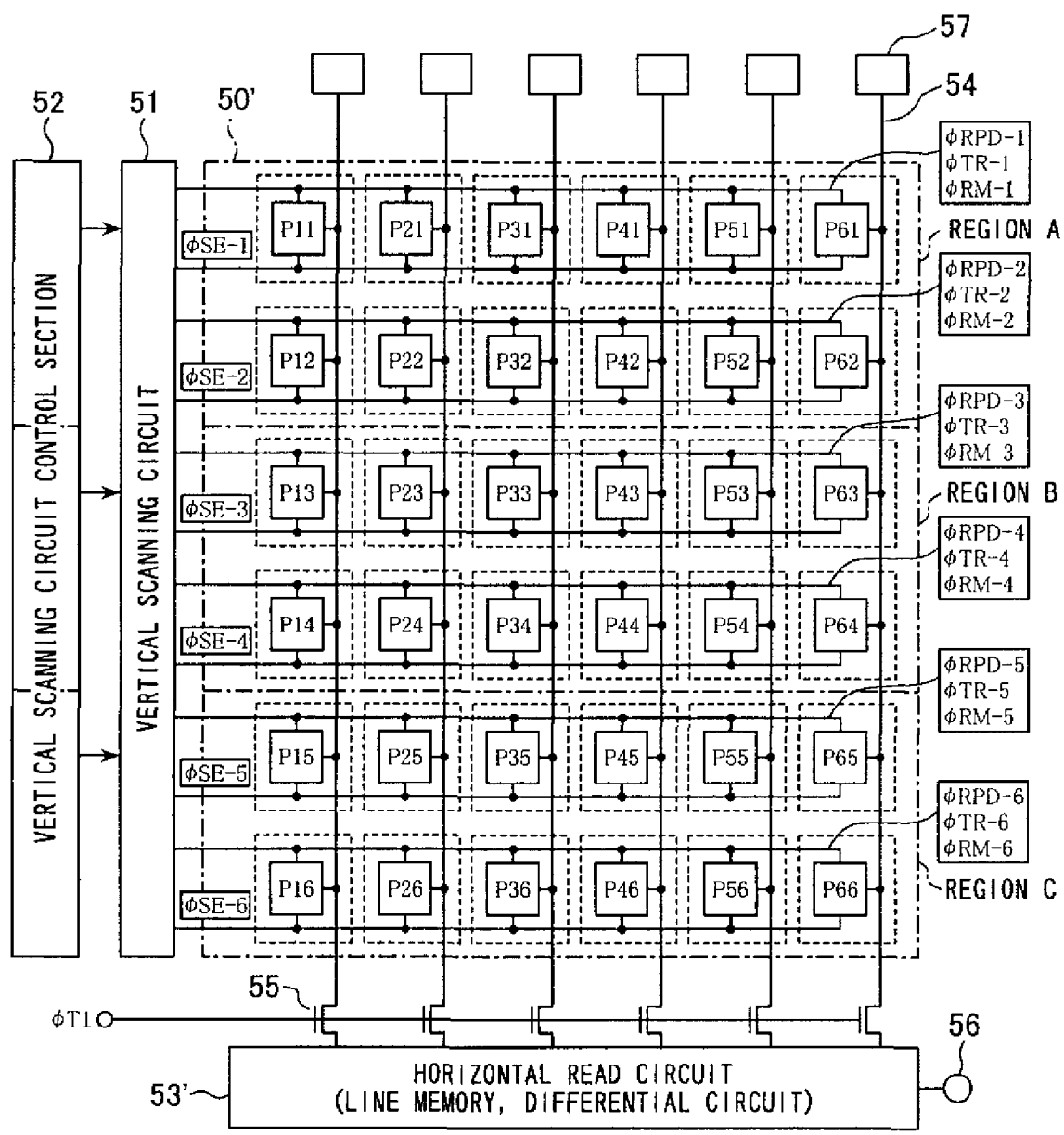
FIG. 11 is a block diagram showing construction of the solid-state imaging device in the solid-state imaging apparatus according to a second embodiment of the invention.

A second embodiment of the invention will now be described. FIG. 11 is a block diagram showing construction of solid-state imaging device in the solid-state imaging apparatus according to the second embodiment. This embodiment is different from the first embodiment shown in FIG. 7 only in construction of the solid-state imaging device, and construction of the other portion is similar to that. The solid-state imaging device according to this embodiment uses pixels having construction similar to the pixel construction shown in FIG. 8. In the construction of the pixel section, on the other hand, a signal-to-be pixel group where the signals of photoelectric conversion device are simultaneously reset for all pixels and, after completion of a predetermined exposure period, the signals generated at photoelectric conversion device are transferred to the charge accumulation section, and a correcting pixel group where the signals generated at photoelectric conversion device are not transferred to the charge accumulation section are disposed alternately on every other row similarly to those shown in FIG. 3. In FIG. 11, pixels of the odd rows (P11 to P61, P13 to P63, P15 to P65) are the signal-to-be pixels, and pixels of the even rows (P12 to P62, P14 to P64, P16 to P66) are the correcting pixels.

It is similar to the first embodiment in that a pixel section 50' having such construction is divided into three read regions (read unit group) A, B, C, and the order of reading each region at the time of a main image taking is set on the basis of a light quantity distribution of each region detected from a preliminary image taking or signal by a photometry section, and in that the order of reading pixel signals is changed by the unit of region.

In the present embodiment, a horizontal read circuit 53' has line memorys for retaining the signal of signal-to-be pixels corresponding to one row and the signal of correcting pixels corresponding to one row, and a differential circuit for outputting a difference signal between the signal of signal-to-be pixel and the signal of correcting pixel of the same column. It is constructed so as to output a difference signal between the signal of signal-to-be pixel of (n+1)-th row and the signal of correcting pixel of (n+2)-th row.

Figure 12:
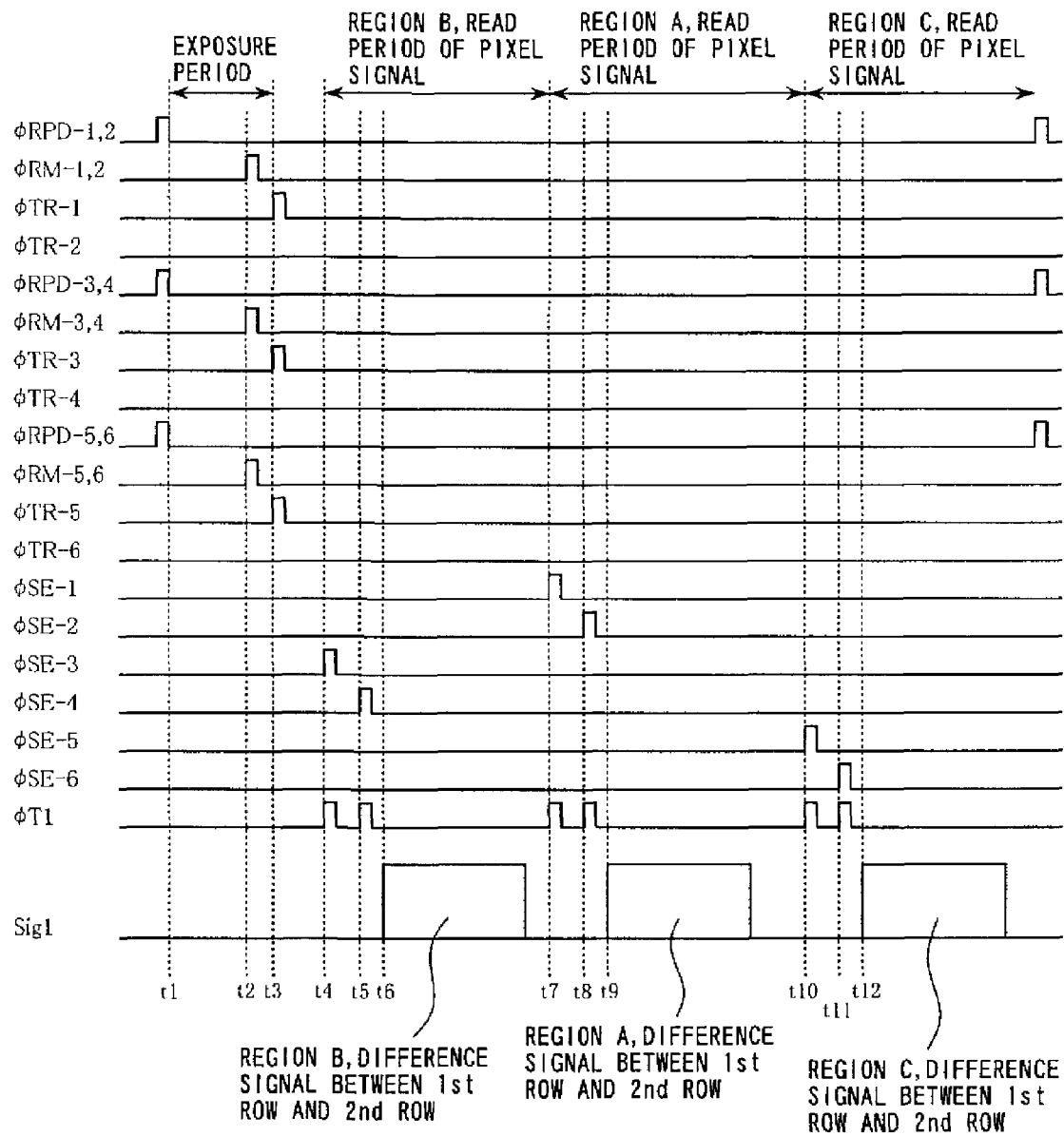
FIG. 12 is a timing chart for explaining operation of the solid-state imaging device shown in FIG. 11.

A description will now be given by way of the timing chart of FIG. 12 with respect to operation where the average value or peak value of light quantity of region B of the three divisional regions A, B, C of the pixel section exceeds the threshold, and thus pixel signals are read out in the order of sequence of region B region A region C of the pixel section.

First at time t1, PD reset pulses φ RPD-1 to φ RPD-6 are driven to "L" level from "H" level to concurrently reset photoelectric conversion device PD and start accumulation of all pixels. Next at time t2, reset pulses φ RM-1 to φ RM-6 are driven to "H" level to concurrently reset the charge accumulation section MEM. Subsequently at time t3, transfer pulses φ TR-1, φ TR-3, φ TR-5 are driven to "H" level so that signals of photoelectric conversion device PD of the signal-to-be pixel group are concurrently transferred to and retained at the charge accumulation section MEM. Here, period from time t1 to t3 becomes an exposure period which is the same for the signal-to-be pixels.

Next at time t4, select pulse φ SE-3 is driven to "H" Level to select the signal-to-be pixel row which is the first row of region B of the pixel section, and in addition fetch pulse φ T1 is driven to "H" level to retain the pixel signals of such signal-to-be pixel row at a signal line memory of the horizontal read circuit 53'. Subsequently at time t5, select pulse φ SE-4 is driven to "H" level to select a correcting pixel row which is the second row of region B of the pixel section, and in addition fetch pulse φ T1 is driven to "H" level to retain the pixel signals of such correcting pixel row at a correction line memory of the horizontal read circuit 53'. At time t6, then, pixel signals retained at the signal line memory and at the correction line memory are inputted to the differential circuit, and difference signals of region B are read out as output signal Sig1 from the output terminal 56.

Further at time t7, t8, select pulses φ SE-1, φ SE-2 are respectively driven to "H" level to respectively select the signal-to-be pixel row at the first row and the correcting pixel row at the second row of region A of the pixel section, and in addition fetch pulse φ T1 is driven to "H" level so that the pixel signals of these pixel rows are retained respectively at the signal line memory and the correction line memory of the horizontal read circuit 53'. At time t9, then, pixel signals retained at the signal line memory and at the correction line memory are inputted to the differential circuit, and difference signals of region A are read out from the output terminal 56.

Similarly at time t10, t11, select pulses φ SE-5, φ SE-6 are respectively driven to "H" level to respectively select the signal-to-be pixel row at the first row and the correcting pixel row at the second row of region C of the pixel section, and in addition fetch pulse φ T1 is driven to "H" level so that the pixel signals of these pixel rows are retained respectively at the signal line memory and the correction line memory of the horizontal read circuit 53'. At time t12, then, pixel signals retained at the signal line memory and at the correction line memory are inputted to the differential circuit, and difference signals of region C are read out as output signal Sig1 from the output terminal 56.

Similarly to the first embodiment, it is possible also in the solid-state imaging device described in the present embodiment to provide a means for suppressing pixel noise and to effect drive accordingly.

A third embodiment of the invention will now be described. A summary of the MOS imaging device of this embodiment is as follows. In particular, two, or first and second photoelectric conversion devices are disposed within one pixel at locations that are regarded as the same position at which image is formed by a taking optical system. At first, the first photoelectric conversion devices of all pixels are concurrently reset, and, after passage of a predetermined exposure time, the second photoelectric conversion devices are concurrently reset. Subsequently, signals are read out substantially simultaneously row by row, and the signal of second photoelectric conversion device is subtracted from the signal of first photoelectric conversion device to obtain a difference signal corresponding to that of reset time. The solid-state imaging device is thereby achieved as having a global shutter function where exposure time of all pixels is uniformed with eliminating the problem of FPN due to dark current or KTC noise. In the third embodiment, the solid-state imaging apparatus according to the invention is formed with using the solid-state imaging device having the above described construction. It should be noted that the construction of the present embodiment other than the solid-state imaging device is similar to the first embodiment shown in FIG. 6.

Figure 13:
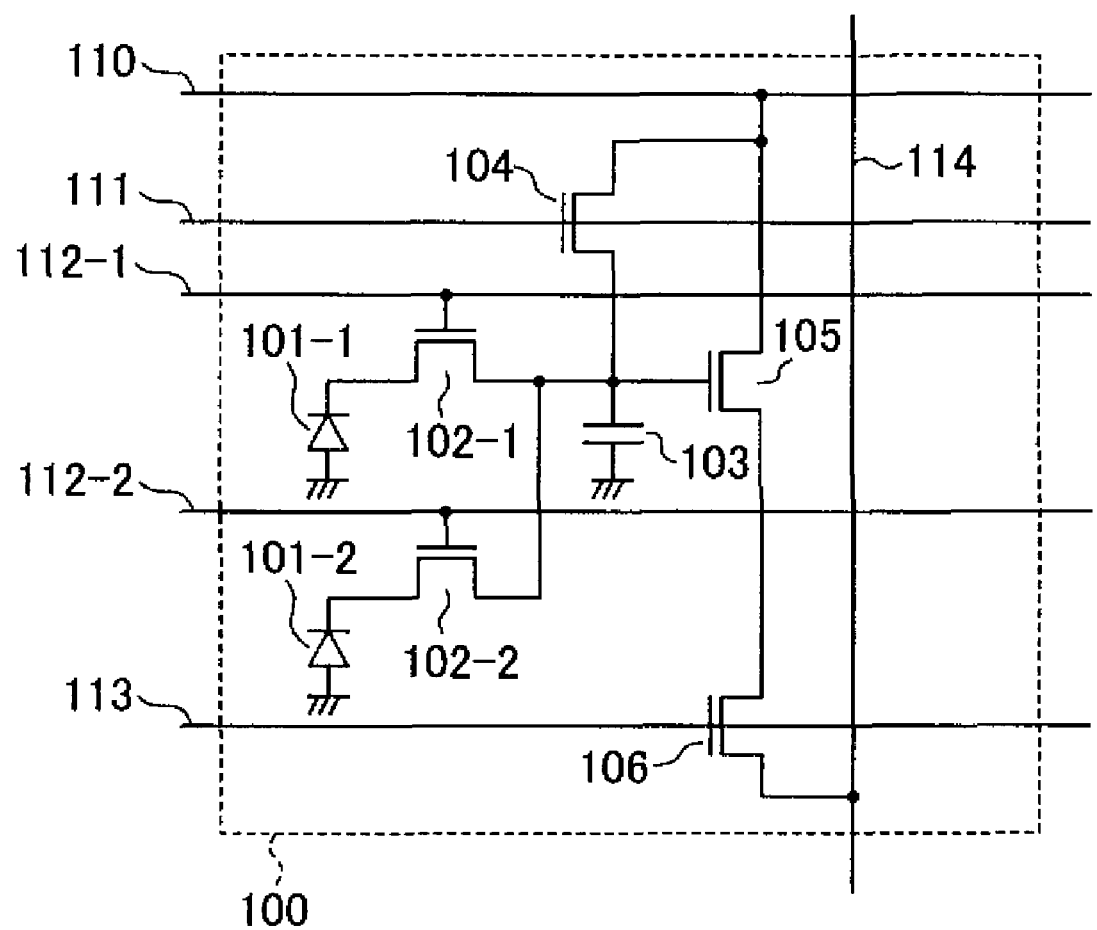
FIG. 13 is a circuit diagram showing a pixel construction of solid-state imaging device in the solid-state imaging apparatus according to a third embodiment of the invention.

A pixel construction of the above described solid-state imaging device will now be described by way of FIG. 13. Denoted by 100 in FIG. 13 is a single pixel. The single pixel 100 has construction where two photoelectric conversion devices are provided in a unit pixel having the conventional 4-Tr construction, and two transfer transistors are provided corresponding thereto. In particular, it includes: a first photoelectric conversion device 101-1 and a second photoelectric conversion device 101-2; a first and second transfer transistors 102-1, 102-2 for transferring signal charges generated at the first and second photoelectric conversion devices 101-1, 101-2 respectively to a charge accumulation section 103; a reset transistor 104 for resetting the charge accumulation section 103, and first and second photoelectric conversion devices 101-1, 101-2; an amplification transistor 105 for amplifying and reading voltage level at the charge accumulation section 103; and a select transistor 106 for selecting the pixel to transmit an output of the amplification transistor 105 to a vertical signal line 114. Here, the first and second photoelectric conversion devices 101-1, 101-2 are provided as having the same size on the same one semiconductor substrate, and located at image forming positions that are optically regarded as the same. Those components but the first and second photoelectric conversion devices 101-1, 101-2 are shielded from light.

Referring to FIG. 13, denoted by 110 is a pixel power supply which is electrically connected respectively to drain of the amplification transistor 105 and drain of the reset transistor 104. Denoted by 111 is a reset line for resetting pixels corresponding to one row, which is electrically connected to the gate of the reset transistor 104 of the pixels corresponding to one row. Denoted by 112-1, 112-2 are a first and second transfer lines for transferring signal charges of the first photoelectric conversion device 101-1 and the second photoelectric conversion device 101-2 of the pixels corresponding to one row to the charge accumulation section 103 of the respective pixel, which are electrically connected respectively to the gates of the first and second transfer transistors 102-1, 102-2 of the pixels corresponding to one row. Denoted by 113 is a select line for selecting pixels corresponding to one row, which is electrically connected to the gate of select transistors 106 corresponding to one row.

Figure 14:
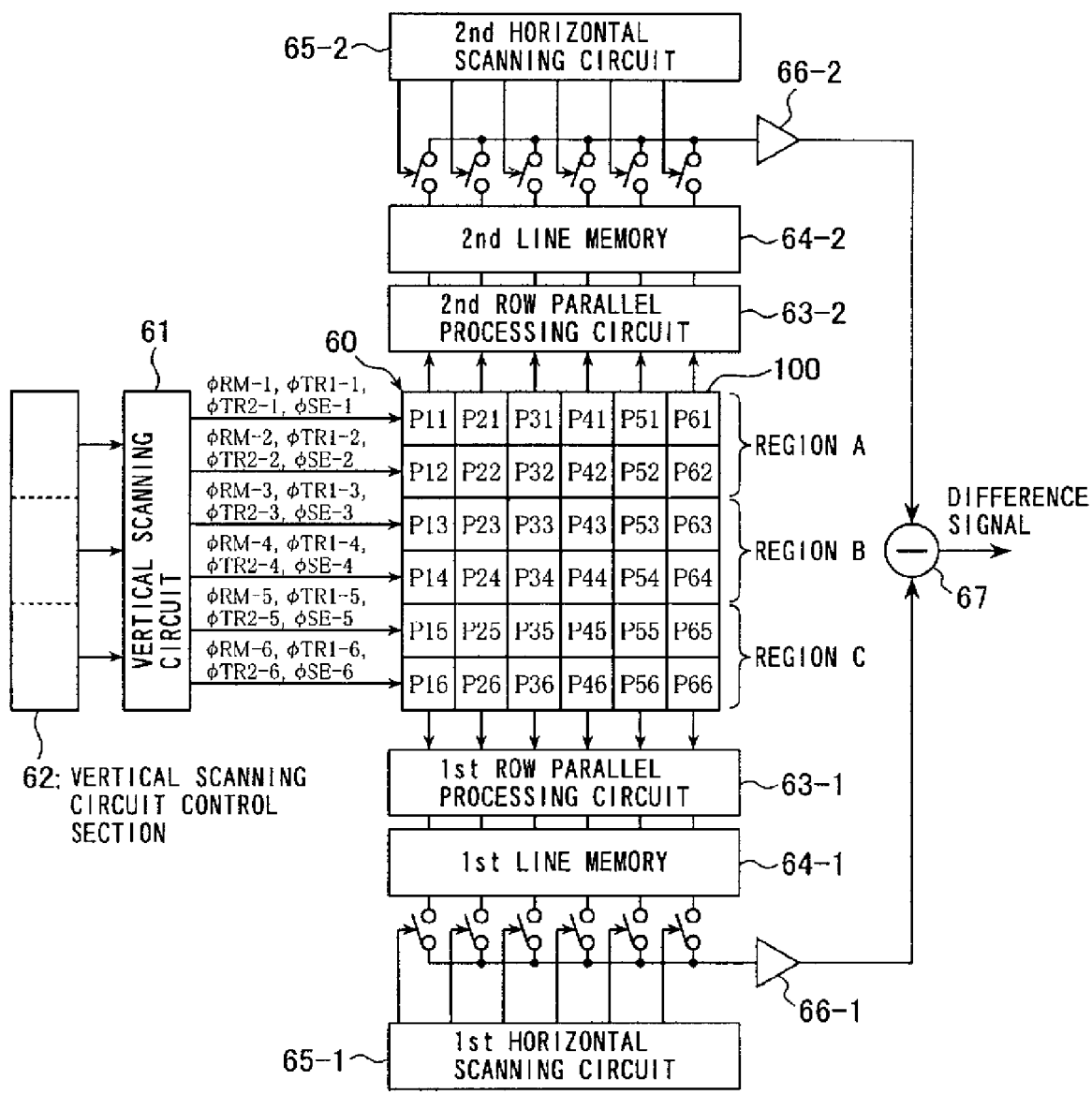
FIG. 14 is a block diagram showing construction of the solid-state imaging device in the solid-state imaging apparatus according to the third embodiment.

FIG. 14 is a block diagram showing an overall construction of the solid-state imaging device according to the third embodiment having a pixel section 60 where single pixels 100 having construction as shown in FIG. 13 are arrayed into 6-rows by 6-columns. Referring to FIG. 14, denoted by 61 is a vertical scanning circuit for scanning the pixel section 60 while outputting row reset pulse φ RM-i, first and second transfer pulses φ TR1-i, φ TR2-i, and row select pulse φ SE-i respectively to the reset line 111, first and second transfer line 112-1, 112-2, and select line 113. Further, denoted by 63-1 is a first row parallel processing circuit for effecting processing such as FPN cancel of the pixel signals from the first photoelectric conversion device 101-1 of the pixels corresponding to one row; 64-1 is a first line memory for storing the result of processing at the first row parallel processing circuit 63-1; and 65-1 is a first horizontal scanning circuit for scanning, while sequentially selecting through select switch, pixel signals of the first photoelectric conversion device 101-1 corresponding to one row stored at the first line memory 64-1, which are outputted through a first amplifier 66-1.

Also, denoted by 63-2 is a second row parallel processing circuit for effecting processing such as FPN cancel of the pixel signals from the second photoelectric conversion device 101-2 of the pixels corresponding to one row; 64-2 is a second line memory for storing the result of processing at the second row parallel processing circuit 63-2; and 65-2 is a second horizontal scanning circuit for scanning, while sequentially selecting through select switch, pixel signals of the second photoelectric conversion device 101-2 corresponding to one row stored at the second line memory 64-2, which are outputted through a second amplifier 66-2. Denoted by 67 is a difference signal output means for outputting a difference signal between the signal from the first photoelectric conversion device 101-1 outputted from the first amplifier 66-1, and the pixel signal from the second photoelectric conversion device 101-2 outputted from the second amplifier 66-2. The first and second horizontal scanning circuits may be a combination. Here, the pixel section 60 is divided into three read regions (read unit group) A, B, C so that the order of reading pixel signals by the unit of region may be changed under an instruction from the vertical scanning circuit control section 62.

Figure 15:
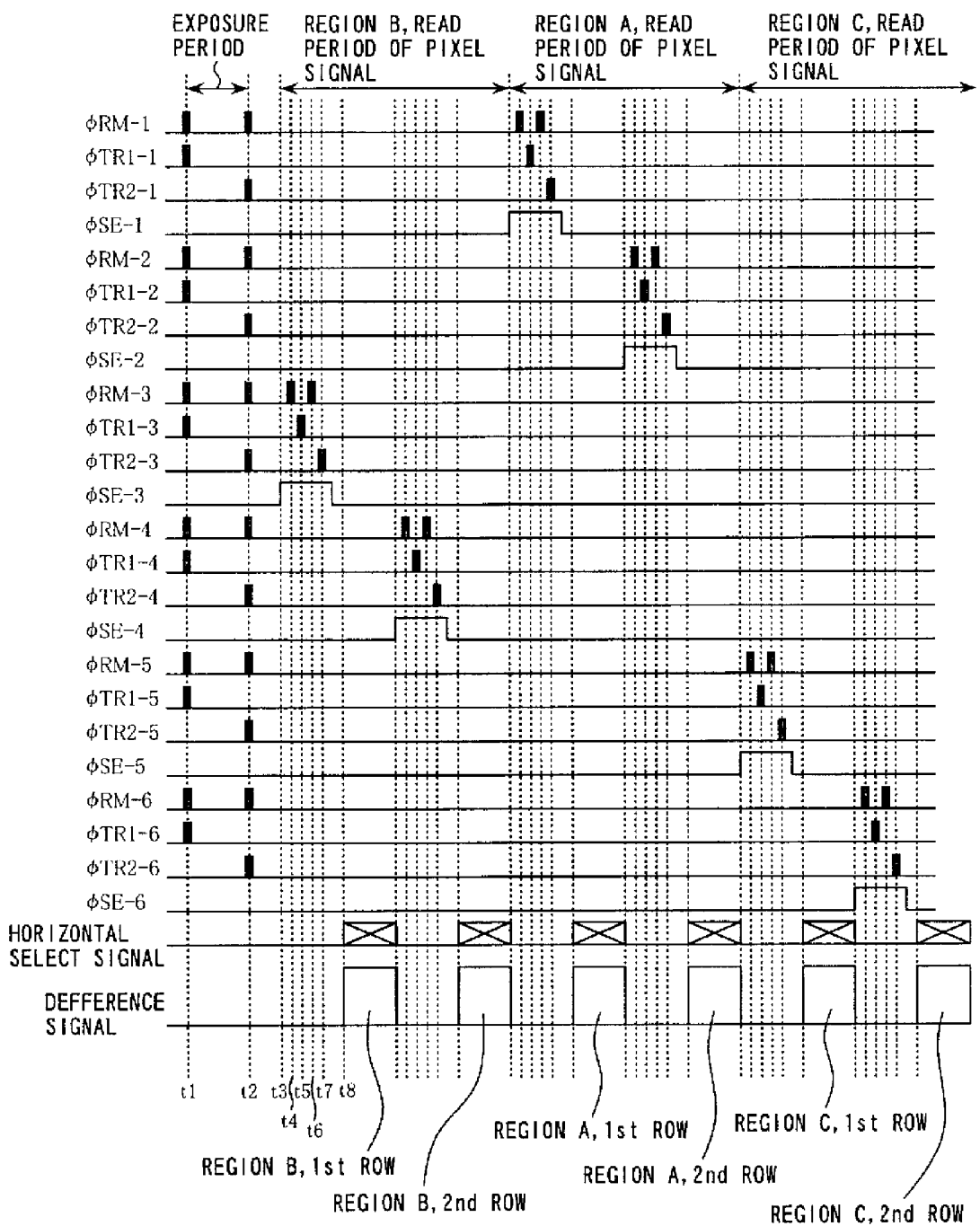
FIG. 15 is a timing chart for explaining operation of the solid-state imaging device shown in FIG. 14.

An operation of the third embodiment having such construction will now be described. Also in this embodiment, a description will be given by way of the timing chart of FIG. 15 with respect to the case where the average value or peak value of light quantity of region B of the three divisional regions A, B, C of the pixel section exceeds a threshold, and thus pixel signals are read out in the order of sequence of region B→region A→region C of the pixel section.

First at time t1, reset pulses φ RM-1 to φ RM-6 and first transfer pulses φ TR1-1 to φ TR1-6 are inputted to all rows of the pixel section to concurrently reset the first photoelectric conversion device 101-1 and charge accumulation section 103 of all pixels and then to start accumulation of all pixels. Next at time t2 after passage of a predetermined time (exposure period), reset pulses φ RM-1 to φ RM-6 and second transfer pulses φ TR2-1 to φ TR2-6 are inputted to all rows to concurrently reset the second photoelectric conversion device 101-2 and charge accumulation section 103 of all pixels.

Next at time t3, select pulse φ SE-3 is driven to "H" level to select the third pixel row or the first row of region B of the pixel section, and subsequently at time t4, reset pulse φ RM-3 is driven to "H" level to reset the charge accumulation section of the third pixel row which is the first row of region B of the pixel section. Subsequently at time t5, the first transfer pulse φ TR1-3 is driven to "H" level to transfer signals of the first photoelectric conversion device 101-1 to the charge accumulation section in the third pixel row which is the first row of region B. Next at time t6, reset pulse φ RM-3 is driven to "H" level to reset again the charge accumulation section of the third pixel row which is the first row of region B. Subsequently at time t7, the second transfer pulse φ TR2-3 is driven to "H" level to transfer signals of the second photoelectric conversion device 101-2 to the charge accumulation section in the third pixel row which is the first row of region B. Subsequently at time t8, the first and second horizontal scanning circuits 65-1, 65-2 are driven so as to output through the difference signal output means 67 a difference signal between the signal of the first photoelectric conversion device 101-1 and the signal of the second photoelectric conversion device 101-2 in the third pixel row which is the first row of region B.

After that, in a similar manner, a difference signal in the fourth pixel row or the second row of region B, difference signal in the first pixel row or the first row of region A, difference signal in the second pixel row or the second row of region A, difference signal in the fifth pixel row or the first row of region C, and difference signal in the sixth pixel row or the second row of region C are sequentially outputted.

While the above described third embodiment has been shown as using a pixel having the first and second photoelectric conversion devices disposed within one pixel, it is also possible to use construction where two unit pixels having conventional 4-Tr construction are simply placed side by side into a combination to form a single pixel. In such case, it is necessary that the respective photoelectric conversion devices of the two unit pixels be located at image forming positions that are optically regarded as the same.

Also in the above second and third embodiments, a light quantity of the object is previously monitored by means of a preliminary image taking or a photometry section. At the time of a main image taking, then, the order of reading regions is controlled so as to read out first a region regarded as read unit group containing a pixel or pixel region where deterioration of signal or spurious signal tends to occur. It is thereby possible to effect the main image taking with suppressing an occurrence of signal deterioration or spurious signal to a minimum.

As has been described by way of the above embodiments, it is possible according to the first aspect of the invention to detect a light quantity distribution of the pixel section and control read sequence of pixel signals so that, if an occurrence of signal deterioration or spurious signal in a read unit group containing a certain pixel or pixel region is predicted from a light quantity distribution information of the pixel section, the occurrence of signal deterioration or spurious signal can be avoided by reading such read unit group first. A solid-state imaging apparatus is thereby achieved as capable of obtaining a high quality image.

According to the second aspect, a high quality image can be obtained, since an occurrence of signal deterioration or spurious signal can be avoided by firstly reading a read unit group containing a pixel having a large quantity of light or pixel region having a large quantity of light.

According to the third aspect, an accurate detection of light quantity distribution is possible with using the same solid-state imaging device as for photographing.

According to the fourth aspect, a light quantity distribution can be detected quickly with using a photometry section separate from the solid-state imaging device.

According to the fifth aspect, a high quality image avoiding an occurrence of signal deterioration or spurious signal can be obtained with a solid-state imaging apparatus using solid-state imaging device having a global shutter function where read operation of pixel signals is effected with determining an exposure period by resetting signals of photoelectric conversion section of all pixels and effecting transfer of signal to the charge accumulation section after a predetermined time.

According to the sixth aspect, a high quality image avoiding an occurrence of signal deterioration or spurious signal can be obtained with a solid-state imaging apparatus using solid-state imaging device having a global shutter function, in which a pixel section is formed of signal-to-be pixels where signals generated at photoelectric conversion section are transferred to the accumulation section and correcting pixels where transfer to the accumulation section is not effected, and difference signal between signal of signal-to-be pixel and signal of correcting pixel is outputted as image signal.

According to the seventh aspect, a high quality image avoiding an occurrence of signal deterioration or spurious signal can be obtained with a solid-state imaging apparatus using solid-state imaging device having a pixel section consisting of pixels each having a first and second photoelectric conversion sections, provided with a global shutter function where the first photoelectric conversion sections are concurrently reset, and after a predetermined exposure period the second photoelectric conversion sections are concurrently reset, and read operation is subsequently effected to output difference signal between them as imaging signal.

What is claimed is:

1. A solid-state imaging apparatus comprising:
a solid-state imaging device having a pixel section containing a plurality of pixels in a two-dimensional array each having a photoelectric conversion section for generating a signal corresponding to a quantity of incident light, a read drive section for setting one or more pixels in said pixel section as a read unit group to effect read operation by the unit of the read unit group, and a global shutter function setting section for obtaining an imaging signal where an exposure start timing and an exposure period of all subject pixels in said pixel section are the same;
a light quantity distribution detecting means for detecting a distribution of said quantity of incident light to the pixel section of said solid-state imaging device; and
a drive control means for setting to said read drive section an order of read sequence of said read unit groups based on a light quantity distribution information of the pixel section detected at said light quantity distribution detecting means,
wherein said drive control means sets the order of read sequence of pixel signal of said read unit groups so that a read unit group containing a pixel with a greater light quantity or a pixel region with a greater light quantity is treated first.

2. The solid-state imaging apparatus according to claim 1, wherein said light quantity distribution detecting means effects a preliminary image taking operation with using said solid-state imaging device to detect said light quantity distribution from image signals outputted from said pixel section in the preliminary image taking.

3. The solid-state imaging apparatus according to claim 1 further comprising a photometry means, wherein said light quantity distribution detecting means detects said light quantity distribution from a photometric signal of said photometry means.

4. The solid-state imaging apparatus according to claim 1, wherein the pixel section of said solid-state imaging device comprises a pixel having said photoelectric conversion section for generating the signal corresponding to the quantity of incident light, an accumulation section for accumulating the signal generated at said photoelectric conversion section, a transfer means for controlling a signal transfer from said photoelectric conversion section to said accumulation section, and a reset means for resetting the signal of said photoelectric conversion section, and
wherein said global shutter function setting section sets said read drive section so as to read and output a signal level at said accumulation section as a pixel signal with determining said exposure period by simultaneously resetting signals of said photoelectric conversion section of all pixels and, after a predetermined time, by simultaneously effecting the signal transfer from said photoelectric conversion section to said accumulation section.

* * * * *